United States Patent
Kusakabe et al.

[11] Patent Number: 6,073,236
[45] Date of Patent: Jun. 6, 2000

[54] AUTHENTICATION METHOD, COMMUNICATION METHOD, AND INFORMATION PROCESSING APPARATUS

[75] Inventors: Susumu Kusakabe, Kanagawa; Masayuki Takada, Tokyo, both of Japan

[73] Assignee: Sony Corporation, Tokyo, Japan

[21] Appl. No.: 08/879,188

[22] Filed: Jun. 20, 1997

[30] Foreign Application Priority Data

Jun. 28, 1996 [JP] Japan ................................. 8-168965

[51] Int. Cl.[7] .............................. H04L 9/12; H04L 9/14; G06F 15/163
[52] U.S. Cl. ......................... 713/169; 713/170; 713/171; 709/227
[58] Field of Search ................................. 380/28, 21, 25, 380/283, 284; 709/227, 228; 713/200, 201, 169, 170, 171

[56] References Cited

U.S. PATENT DOCUMENTS

| | | | |
|---|---|---|---|
| 5,737,421 | 4/1998 | Audebert | 380/23 |
| 5,850,446 | 12/1998 | Berger et al. | 380/24 |
| 5,870,473 | 2/1999 | Boesch et al. | 380/21 |

*Primary Examiner*—Tod R Swann
*Assistant Examiner*—Justin T. Durrow
*Attorney, Agent, or Firm*—Jay H. Maioli

[57] ABSTRACT

Mutual authentication is performed. A reader/writer (R/W) transmits to an IC card a code $C_1$ that is a random number $R_A$ encrypted using a key $K_B$. The IC card decrypts the code $C_1$ into plain text $M_1$ using the key $K_B$. The IC card transmits to the R/W a code $C_2$ that is the plain text $M_1$ encrypted using a key $K_A$ and a code $C_3$ that is a random number $R_B$ encrypted using the key $K_A$. The R/W decrypts the codes $C_2$ and $C_3$ into plain text $M_2$ and plain text $M_3$, respectively, using the key $K_A$. When the R/W determines that the plain text $M_2$ and the random number $R_A$ are the same, it authenticates the IC card. Next, the R/W transmits to the IC card a code $C_4$ that is the plain text $M_3$ encrypted using the key $K_B$. The IC card decrypts the code $C_4$ into plain text $M_4$ using the key $K_B$. When the IC card determines that the plain text $M_4$ and the random number $R_B$ are the same, it authenticates the R/W.

30 Claims, 14 Drawing Sheets

AUTHENTICATION METHOD, COMMUNICATION METHOD, AND INFORMATION PROCESSING APPARATUS

BACKGROUND OF THE INVENTION

1. Field of the Invention

The present invention relates to an authentication method, a communication method, and an information processing apparatus. More particularly, the present invention relates to an authentication method in which a plurality of information processing apparatuses authenticate one another, a communication method, and an information processing apparatus.

2. Description of the Related Art

With the development of information processing technology, large amounts of information are communicated over predetermined transmission lines. Most transmission lines over which information is communicated are such that a third party (a party except for a transmission party or a receiving party) is capable of intercepting data which is being communicated.

When communications are performed using such transmission lines without wanting information to be leaked to a third party, codes are often used. As a result of using codes and communicating encrypted data, even if the encrypted data can be intercepted, it is difficult for a third party to read the contents of the communicated information from such data.

For such an encryption method of generating codes, a method is often used which generates codes (data which is transmitted actually) from plain text (information to be transmitted).

For such codes using keys, there are two types: symmetric key codes and public key codes. In the symmetric key codes, the key (encryption key data) during encryption and the key (decryption key data) during decryption are the same. For example, as symmetric key codes, a DES (Data Encryption Standard), one of the Feistel codes, is often used. On the other hand, in the public key codes, encryption key data differs from decryption key data. Further, the receiving party makes public the encryption key data from among those keys for the sake of the transmission party, but keeps the decryption key data hidden without making it public data (that is, only the receiving party knows the decryption key).

FIG. 14 shows an example of such a communication (secret communication) using keys (symmetric keys). A transmission party 101 encrypts information (plain text M) to be transmitted into a code C by using a key K. Then, the transmission party 101 transmits the code C to a receiving party 102 over a predetermined transmission line.

The receiving party 102 receives the code C and decrypts it by using the same key K as the key K that the transmission party 101 has in order to obtain the information (plain text M) transmitted from the transmission party 101. With communications performed in this way, even if the code C is intercepted, it is difficult for a third party to obtain transmitted information (plain text M).

Further, it is possible to determine (authenticate) if the communication party is an authorized receiving party by using such keys. FIG. 15 shows an example of authentication using keys (symmetric keys). A party 111 who determines authentication generates a random number M and transmits the random number M to a party 112 who is authenticated. The authentication party 111 causes the party 112 who is authenticated to encrypt the random number M into a code C by using the key K and to transmit the code C. Then, the authentication party 111 receives the code C and decrypts it into plain text M1 using the key K. Then, the authentication party 111 makes a determination if the random number M and the plain text M1 match each other. When they match each other, the authentication party 111 authenticates the party 112 who is authenticated.

In this way, it is possible for the transmission party (the authentication party 111) to determine (authenticate) if the receiving party (the party 112 who is authenticated) is an authorized receiving party (has the same key as that of the transmission party). At this time, even if the random number M which is plain text and the code C containing the encrypted random number M are intercepted by a third party, since it is difficult to generate the key K from the plain text M and the code C, only the authorized receiving party having the same key K as the key K of the transmission party (the authentication party 111) becomes authenticated.

However, in the above-described authentication method, predetermined transmission and receiving parties merely authenticate other transmission and receiving parties. Therefore, if, for example, the above-described authentication method is applied to a card system formed of a reader/writer (R/W) and an IC card, there are problems in that although it is possible for the R/W to determine (authenticate the communication party) if the communication party is an authorized IC card, it is difficult for the IC card to determine if the communication party is an authorized R/W.

SUMMARY OF THE INVENTION

The present invention has been achieved in view of such circumstances. In a plurality of information processing apparatuses, plain text is transmitted between parties, the transmitted plain text is received, the received plain text is encrypted into codes, and the codes are transmitted to the apparatus which transmitted the plain text. Further, the transmitted codes are received, and the plain text that has been decrypted is compared with the plain text which was initially transmitted, and thus the information processing apparatuses authenticate one another.

The authentication method comprises the steps of: encrypting first data into a first code using the first key by the encryption means of the first information processing apparatus; decrypting the first code into second data using the first key by the decryption means of the second information processing apparatus; encrypting the second data into a second code using the second key by the encryption means of the second information processing apparatus; encrypting third data into a third code using the second key by the encryption means of the second information processing apparatus; decrypting the second code into fourth data using the second key by the decryption means of the first information processing apparatus; authenticating the second information processing apparatus by the first information processing apparatus on the basis of the first data and the fourth data; decrypting the third code into fifth data using the second key by the decryption means of the first information processing apparatus; encrypting the fifth data into a fourth code using the first key by the encryption means of the first information processing apparatus; decrypting the fourth code into sixth data using the first key by the decryption means of the second information processing apparatus; and authenticating the first information processing apparatus by the second information processing apparatus on the basis of the third data and the sixth data.

The communication method comprises the steps of: encrypting first data into a first code using the first key by the encryption means of the first information processing apparatus; transmitting the first code to the second information processing apparatus by the transmission means of the first information processing apparatus; receiving the first code by the receiving means of the second information processing apparatus; decrypting the first code into second data using the first key by the decryption means of the second information processing apparatus; encrypting the second data into a second code using the second key by the encrypting means of the second information processing apparatus; encrypting third data into a third code using the second key by the encryption means of the second information processing apparatus; transmitting the second code and the third code by the transmission means of the second information processing apparatus; receiving the second code and the third code by the receiving means of the first information processing apparatus; decrypting the second code into fourth data using the second key by the decryption means of the first information processing apparatus; authenticating second information processing apparatus by the first information processing apparatus on the basis of the first data and the fourth data; decrypting the third code into fifth data using the second key by the decryption means of the first information processing apparatus; encrypting the fifth data into a fourth code using the first key by the second encryption means of the first information processing apparatus; transmitting the fourth code to the second information processing apparatus by the transmission means of the first information processing apparatus; receiving the fourth code by the receiving means of the second information processing apparatus; decrypting the fourth code into sixth data using the first key by the decryption means of the second information processing apparatus; and authenticating the first information processing apparatus by the second information processing apparatus on the basis of the third data and the sixth data.

The information processing apparatus is further provided with authentication means for authenticating another information processing apparatus on the basis of the predetermined data and data generated by decrypting the code received from the other information processing apparatus, wherein the encryption means encrypts first data into a first code using the first key, the transmission means transmits the first code to the other information processing apparatus, the receiving means receives second and third codes from the other information processing apparatus, the decryption means decrypts the second code into fourth data using the second key and further decrypts the third code into fifth data using the second key, the authentication means authenticates the other information processing apparatus on the basis of the first data and the fourth data, the encryption means encrypts the fifth data into a fourth code using the first key, and the transmission means transmits the fourth code to the other information processing apparatus.

The information processing apparatus is further provided with authentication means for authenticating another information processing apparatus on the basis of the predetermined data and data obtained by decrypting a code received from the other information processing apparatus, wherein the receiving means receives a first code from the other information processing apparatus, the decryption means decrypts the first code into second data using the first key, the encryption means encrypts the second data into a second code using the second key and further encrypts third data into a third code using the second key, the transmission means transmits the second and third codes to the other information processing apparatus, the receiving means receives a fourth code from the other information processing apparatus, the decryption means decrypts the fourth code into sixth data using the second key, and the authentication means authenticates the other information processing apparatus on the basis of the third data and the sixth data.

The above and further objects, aspects and novel features of the invention will become more apparent from the following detailed description when read in connection with the accompanying drawings.

DESCRIPTION OF THE PREFERRED EMBODIMENT

Figure 1:
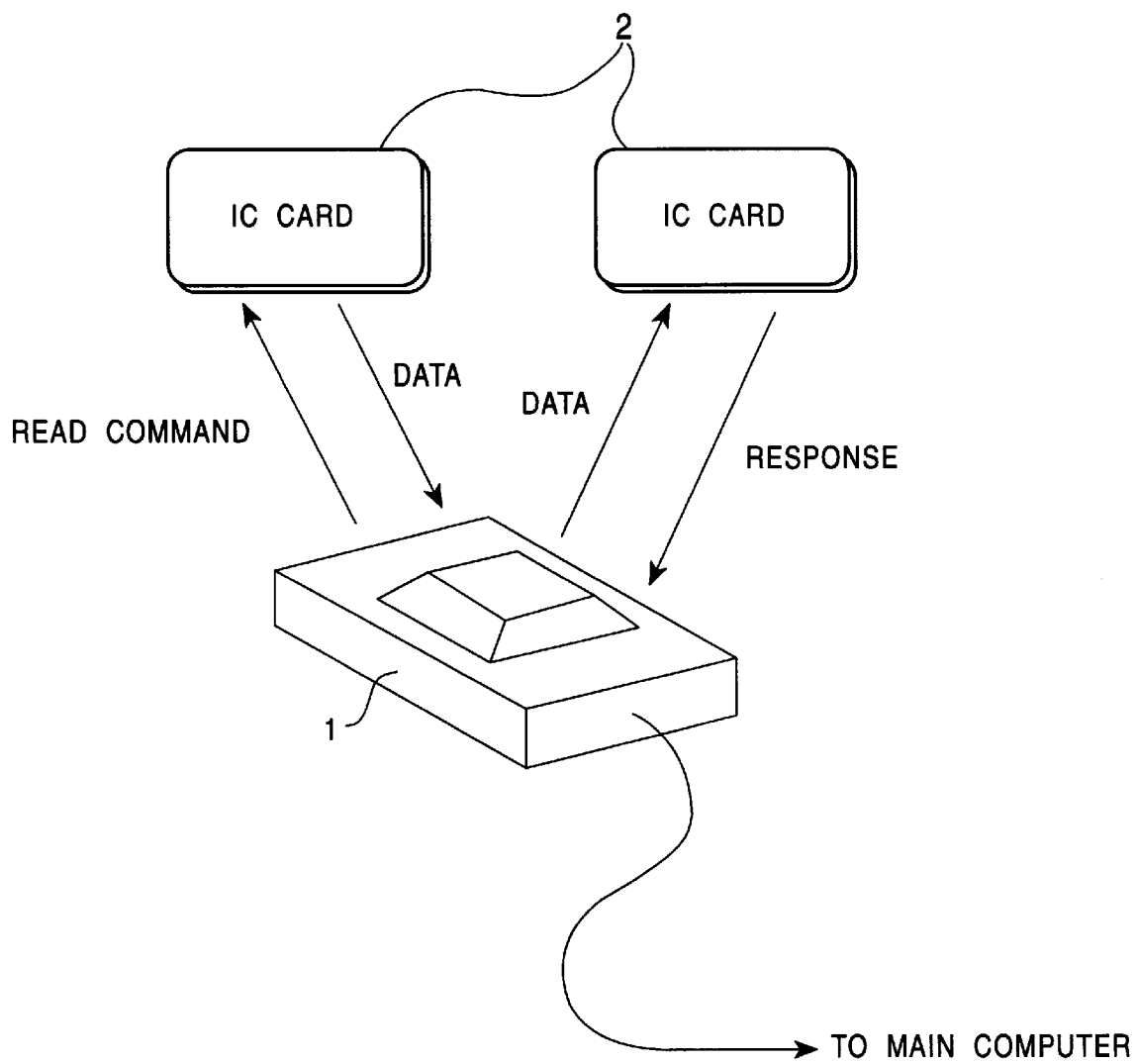
FIG. 1 shows an example of a non-contact card system formed of an R/W 1 and an IC card 2.

FIG. 1 shows an example of a non-contact card system utilizing an R/W 1 and an IC card 2. The R/W 1 and the IC card 2 transmit and receive data in a non-contact manner by using electromagnetic waves.

For example, when the R/W 1 transmits a read command to the IC card 2, the IC card 2 receives the read command and transmits the data indicated by the read command to the R/W 1.

Also, when the R/W 1 transmits data to the IC card 2, the IC card 2 receives the data, stores the received data in a built-in memory 84 (FIG. 6) (storage means), and transmits to the R/W 1 a predetermined response signal indicating that the data has been stored.

Figure 2:
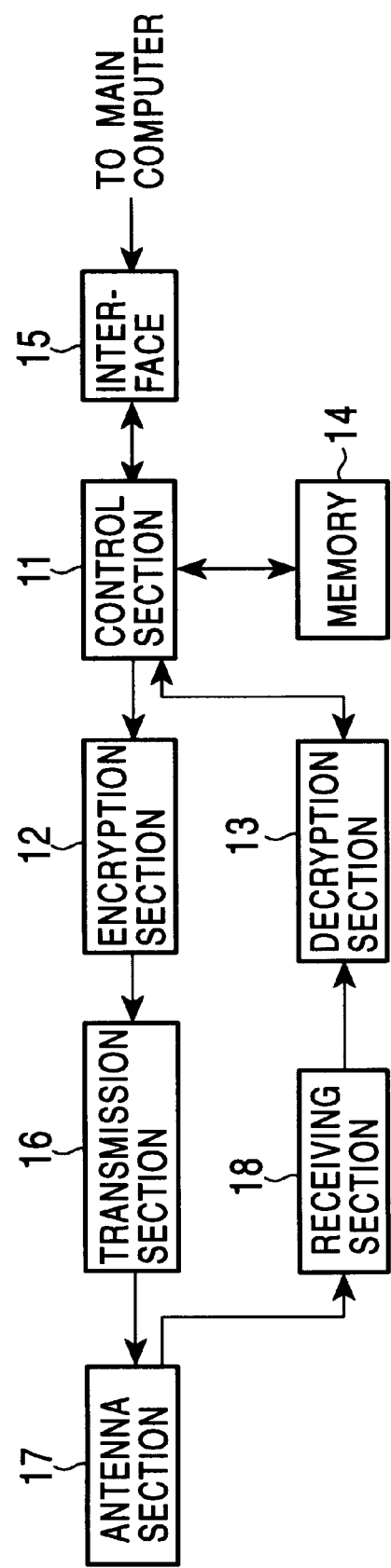
FIG. 2 is a block diagram illustrating the construction of the R/W 1 in accordance with an embodiment of the present invention.

FIG. 2 shows the construction of the R/W 1 in accordance with an embodiment of the present invention.

In the R/W 1, a control section 11 performs various processes in accordance with stored programs. For example, the control section 11 outputs data to be transmitted to the IC card 2 to an encryption section 12 (encryption means) and processes response data from the IC card 2, supplied from a decryption section 13 (decryption means).

Further, the control section 11 reads from a memory 14 (storage means) a key $K_A$ (second key) or a key $K_B$ (first key) used for encryption or decryption and outputs the key $K_A$ or the key $K_B$ to the encryption section 12 or the decryption section 13. Further, the control section 11 performs communications with a main computer (not shown) through an interface 15.

The memory 14 stores data and the like used for processes in the control section 11 and also stores two keys $K_A$ and $K_B$ used for encryption and decryption.

The encryption section 12 encrypts data supplied from the control section 11 by a predetermined key and outputs the encrypted data (code) to a transmission section 16 (transmission means).

The transmission section 16 modulates the data (code) supplied from the encryption section 12 by a predetermined modulation method (e.g., PSK (Phase Shift Keying) modulation method) and transmits the generated modulated waves to the IC card 2 via an antenna section 17.

A receiving section 18 (receiving means) receives the modulated waves transmitted from the IC card 2 via the antenna section 17, demodulates the modulated waves by a demodulation method corresponding to the modulated waves, and outputs the demodulated data (code) to the decryption section 13.

The decryption section 13 decrypts the data (code) supplied from the receiving section 18 using a predetermined key and outputs the decrypted data to the control section 11.

Figure 3:
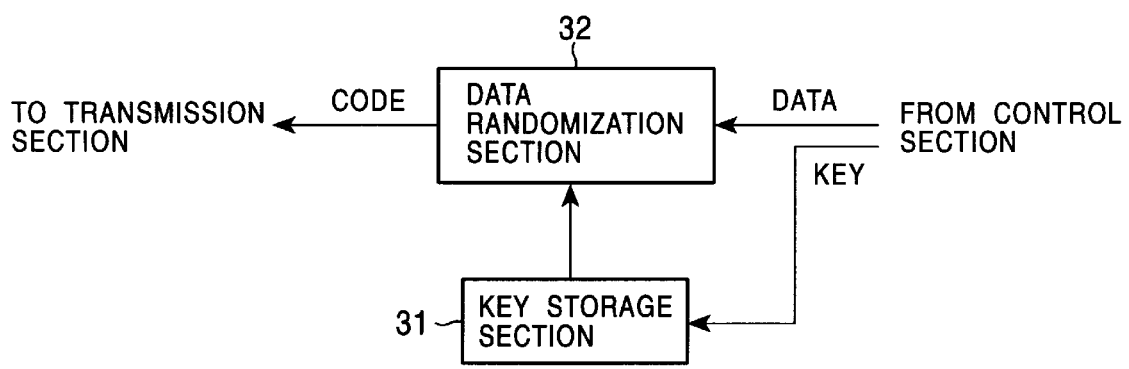
FIG. 3 is a block diagram illustrating an example of the construction of an encryption section 12 in FIG. 2.

FIG. 3 shows an example of the construction of the encryption section 12 of FIG. 2. In the encryption section 12, a key storage section 31 stores a key K supplied from the control section 11.

A data randomization section 32 reads the key K from the key storage section 31, encrypts the data supplied from the key storage section 31 using the key K, and outputs the generated code to the transmission section 16.

Figure 4:
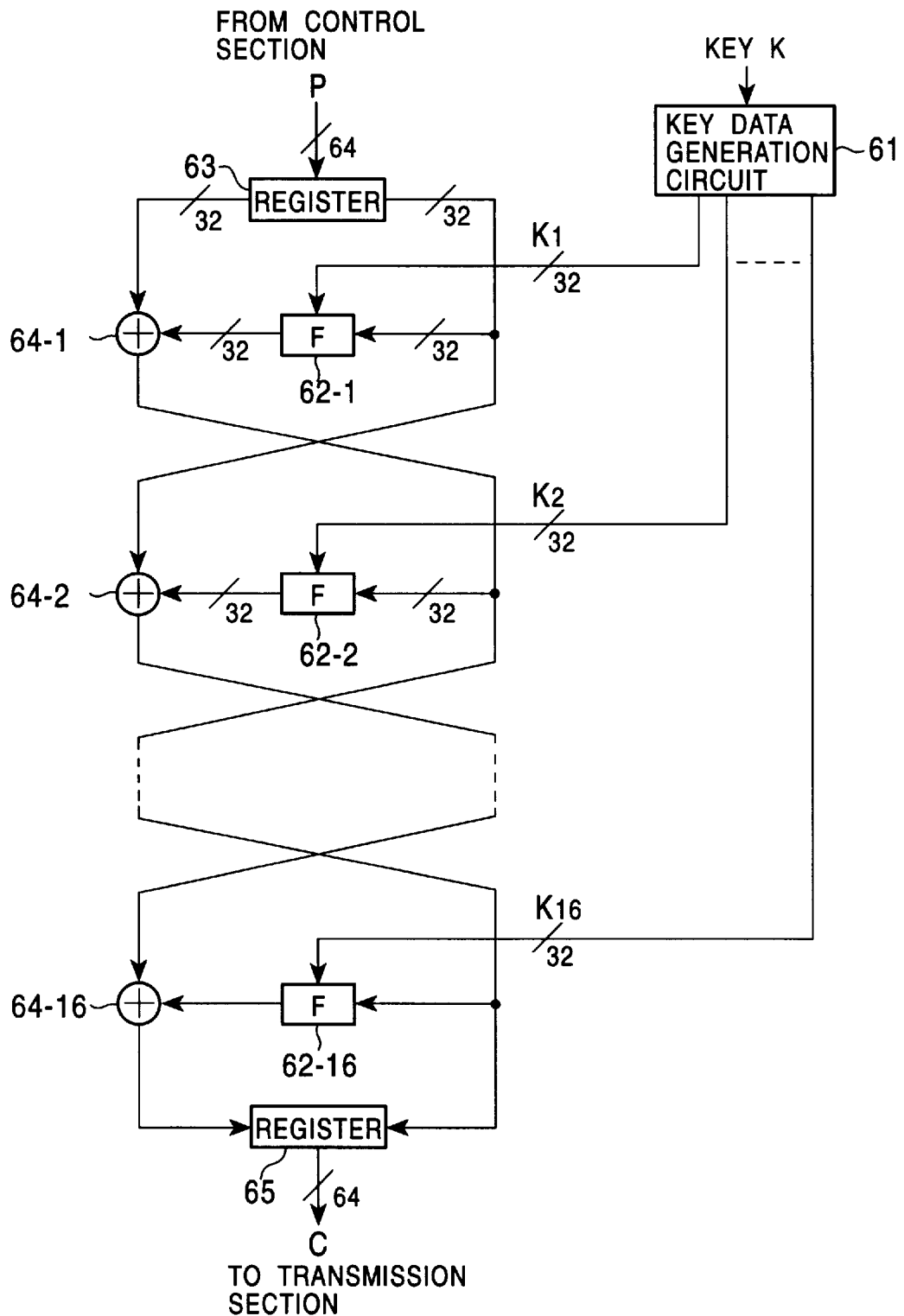
FIG. 4 is a block diagram illustrating an example of the construction of a data randomization section 32 in FIG. 3.

FIG. 4 shows an example of the construction of the data randomization section 32 of FIG. 3. This data randomization section 32 generates a code by a DES method (for example, described in "Code and Information Security" (Shokodo), Edited by Shigeo Tsujii, Masao Kasahara, 1990) which performs a plurality of involution processes. In this data randomization section 32, a key data generation circuit 61 computes 16 key data $K_1$ to $K_{16}$ from the key K read from the key storage section 31 and outputs the key data $K_1$ to $K_{16}$ to computation circuits 62-1 to 62-16, respectively.

A register 63 holds 64-bit data (8 bytes) supplied from the control section 11, outputs the high-order 32 bits of the 64-bit data to an adder 64-1 and outputs the low-order 32 bits thereof to a computation circuit 62-1 and an adder 64-2.

A computation circuit 62-i (i=1, . . . , 16) performs a predetermined conversion, using key data $K_i$ supplied from the key data generation circuit 61, on the low-order 32-bit data of the register 63 (in the case of the computation circuit 62-1) or the 32-bit data supplied from the adder 64-(i-1) (in the case of the computation circuits 62-2 to 62-16), and outputs the converted 32-bit data to the adder 64-i.

An adder 64-i (i=1, . . . , 16) computes the exclusive OR (exclusive OR for each bit) of 32-bit data supplied from either one of the high-order 32 bits of the register 63 (in the case of the adder 64-1), the low-order 32 bits of the register 63 (in the case of the adder 64-2), or the adder 64-(i-2) (in the case of the adders 64-3 to 64-16), and the 32-bit data supplied from the computation circuit 62-i, and outputs the exclusive OR (32 bits) to either one of the adder 64-(i+2) (in the case of the adders 64-1 to 64-14), the low-order 32 bits of a register 65 (in the case of the adder 64-15), or the high-order 32 bits of the register 65 (in the case of the adder 64-16), and the computation circuit 62-(i+1) (in the case of the adders 64-1 to 64-15).

The register 65 holds the 32-bit data supplied from the adder 64-15 in the low-order 32 bits thereof, holds the 32-bit data supplied from the adder 64-16 in the high-order 32 bits, and further outputs the 64-bit data formed of these two 32-bit data, as a code, to the transmission section 16.

Figure 5:
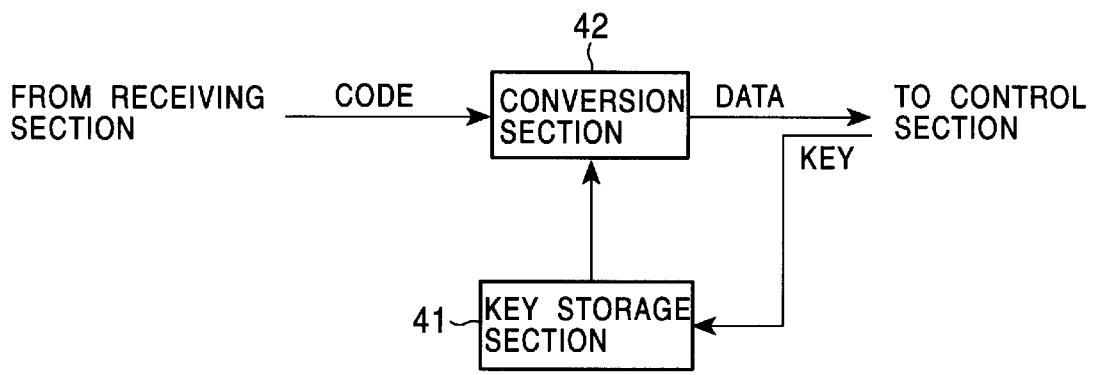
FIG. 5 is a block diagram illustrating an example of the construction of a decryption section 13 in FIG. 2.

FIG. 5 shows an example of the construction of the decryption section 13 of FIG. 2. In this decryption section 13, a key storage section 41 holds a key K supplied from the control section 11.

A conversion section 42, having the same construction as that of the data randomization section 32 of FIG. 4, reads a key K from the key storage section 41, supplies the data (the code encrypted by the DES method) supplied from the receiving section 18 to the register 63, after which it performs the same operation as that of the data randomization section 32 of FIG. 4 in order to decrypt the data and outputs the decrypted data from the register 65 to the control section 11.

Figure 6:
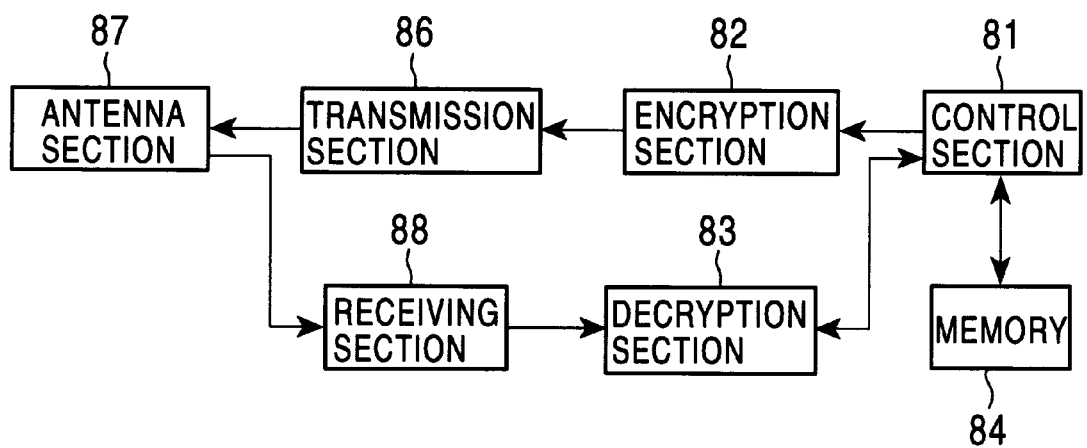
FIG. 6 is a block diagram illustrating the construction of an IC card 2 in accordance with the embodiment of the present invention.

FIG. 6 shows an example of the construction of the IC card 2 in accordance with the embodiment of the present invention.

In the IC card 2, a control section 81 (processing means) performs various processes in accordance with a command supplied from the R/W 1. The control section 81 receives a command from the R/W 1 from a decryption section 83 (decryption means), performs a process corresponding to the command, and outputs response data (to be transmitted to the R/W 1) corresponding to the processing result to an encryption section 82 (encryption means).

Further, the control section 81 reads from a memory 84 a key $K_A$ or a key $K_B$ used for encryption or decryption and outputs the key $K_A$ or the key $K_B$ to the encryption section 82 or the decryption section 83.

The memory 84 has a RAM (Random Access Memory) section (approximately 128 kilobytes) and a ROM (Read Only Memory) section (approximately 512 kilobytes). Of these, the RAM section temporarily stores data and the like used for processing in the control section 81. Meanwhile, the ROM section has prestored therein two keys $K_A$ and $K_B$ used for encryption and decryption.

The encryption section 82 and the decryption section 83 have the same construction as those of the encryption section 12 of FIG. 3 and the decryption section 13 of FIG. 5, and therefore, a description thereof has been omitted.

A transmission section 86 (transmission means) modulates data (code) supplied from the encryption section 82 by a predetermined modulation method (e.g., a PSK (Phase Shift Keying) modulation method) and transmits the generated modulated waves to the R/W 1 via an antenna section 87.

A receiving section 88 (receiving means) receives modulated waves transmitted from the R/W 1 via the antenna section 87, demodulates them by a demodulation method corresponding to the modulated waves, and outputs the demodulated data (code) to the decryption section 83.

Next, while referring to the flowcharts of FIGS. 7 and 8, and FIGS. 4 and 9, the operation of mutual authentication of the R/W 1 and the IC card 2 will be described.

Figure 7:
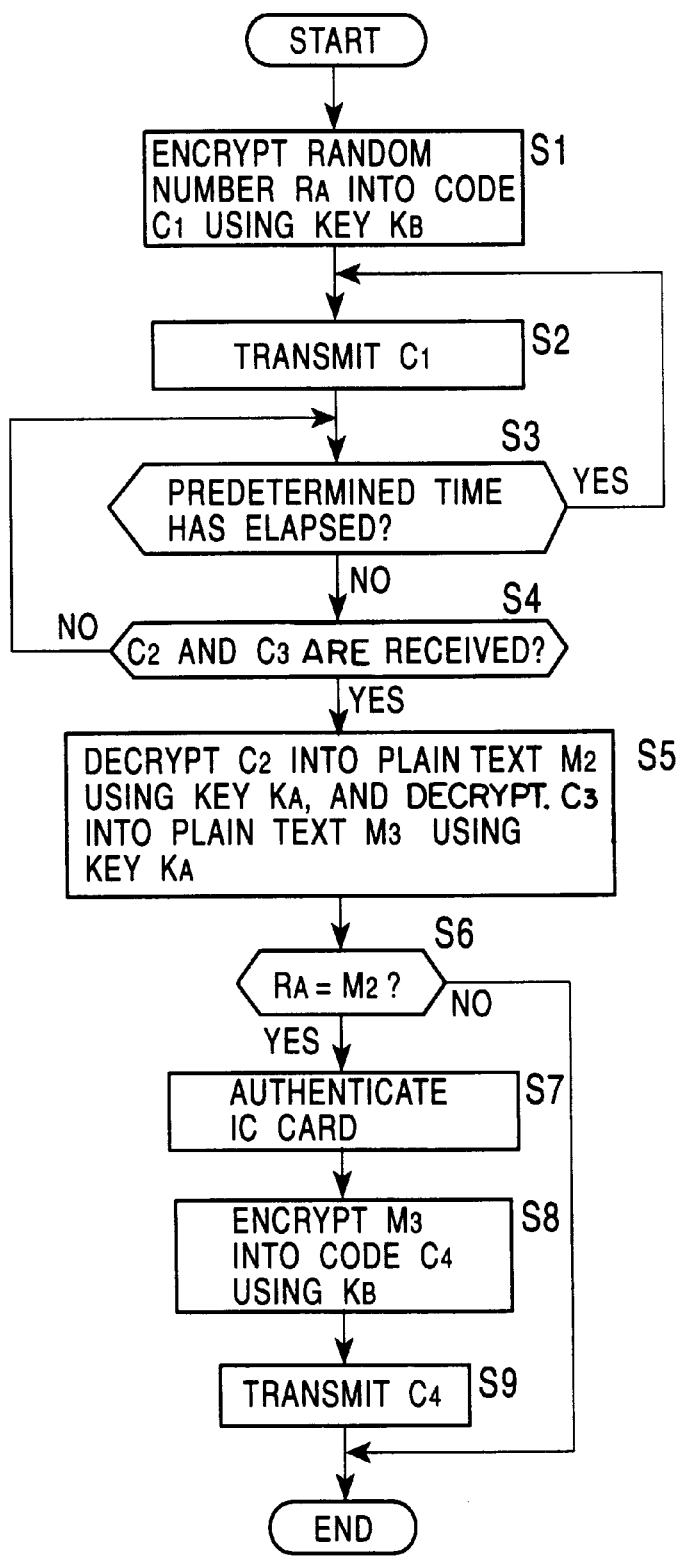
FIG. 7 is a flowchart illustrating the operation of the R/W 1 during mutual authentication in FIG. 1.

Initially, in step S1 in FIG. 7, the control section 11 of the R/W 1 generates a 64-bit random number $R_A$ (first data) and outputs it to the data randomization section 32 of the encryption section 12, and further reads a key $K_B$ from the memory 14 and outputs it to the key storage section 31 of the encryption section 12.

The data randomization section 32 of the encryption section 12 of FIG. 3 reads the key $K_B$ from the key storage section 31. Then, a key data generation circuit 61 of the data randomization section 32 of FIG. 4 generates 16 key data $K_1$ to $K_{16}$ from the key $K_B$ and outputs it to the computation circuits 62-1 to 62-16, respectively.

A register 63 of the data randomization section 32 outputs the high-order 32 bits of the random number $R_A$ supplied from the R/W 1 to the adder 64-1 and outputs the low-order 32 bits of the random number $R_A$ to the computation circuit 62-1 and the adder 64-2. The computation circuit 62-1 converts the 32-bit data using the key data $K_1$ and outputs the converted data to the adder 64-1. The adder 64-1 computes the exclusive OR (exclusive OR for each bit) of the 32-bit data supplied from the register 63 and the 32-bit data supplied from the computation circuit 62-1, and outputs the exclusive OR (32 bits) to the computation circuit 62-2 and the adder 64-3.

Next, the computation circuit 62-2 converts the 32-bit data using the key data $K_2$ and outputs the converted data (32 bits) to the adder 64-2. The adder 64-2 computes the exclusive OR of the 32-bit data supplied from the register 63 and the 32-bit data supplied from the computation circuit 62-2, and outputs the exclusive OR to the computation circuit 62-3 and the adder 64-4.

The computation circuits 62-3 to 62-14 and the adders 64-3 to 64-14 perform in sequence the same operation as that of the computation circuit 62-2 and the adder 64-2. That is, the computation circuit 62-i (j=3, . . . , 14) converts the 32-bit data supplied from the adder 64-(j−1) by using key data $K_j$ and outputs the converted data to the adder 64-j. The adder 64-j (j=3, . . . , 14) computes the exclusive OR of the 32-bit data supplied from the adder 64-(j−2) and the 32-bit data supplied from the computation circuit 62-j, and outputs the exclusive OR to the computation circuit 62-(j+1) and the adder 64-(j+2).

Further, the computation circuit 62-15 converts the 32-bit data supplied from the adder 64-14 by using the key data $K_{15}$ and outputs the converted data to the adder 64-15. The adder 64-15 computes the exclusive OR of the 32-bit data supplied from the adder 64-13 and the 32-bit data supplied from the computation circuit 62-15, and outputs the exclusive OR to the computation circuit 62-16 and the low-order 32 bits of the register 65.

Then, the computation circuit 62-16 converts the 32-bit data by using the key data $K_{16}$ and outputs the converted data to the adder 64-16. The adder 64-16 computes the exclusive OR of the 32-bit data supplied from the adder 64-14 and the 32-bit data supplied from the computation circuit 62-16, and outputs it to the high-order 32 bits of the register 65.

In the above-described way, a code is generated by performing a computation of a total of 16 stages. Then, the register 65 of the data randomization section 32 outputs the generated code $C_1$ (a first code) ($[R_A]_B$ of FIG. 9) to the transmission section 16.

Next, in step S2, of FIG. 7 the transmission section 16 of the R/W 1 modulates the code $C_1$ supplied from the encryption section 12 and transmits the generated modulated waves to the IC card 2 via the antenna section 17.

Figure 8:
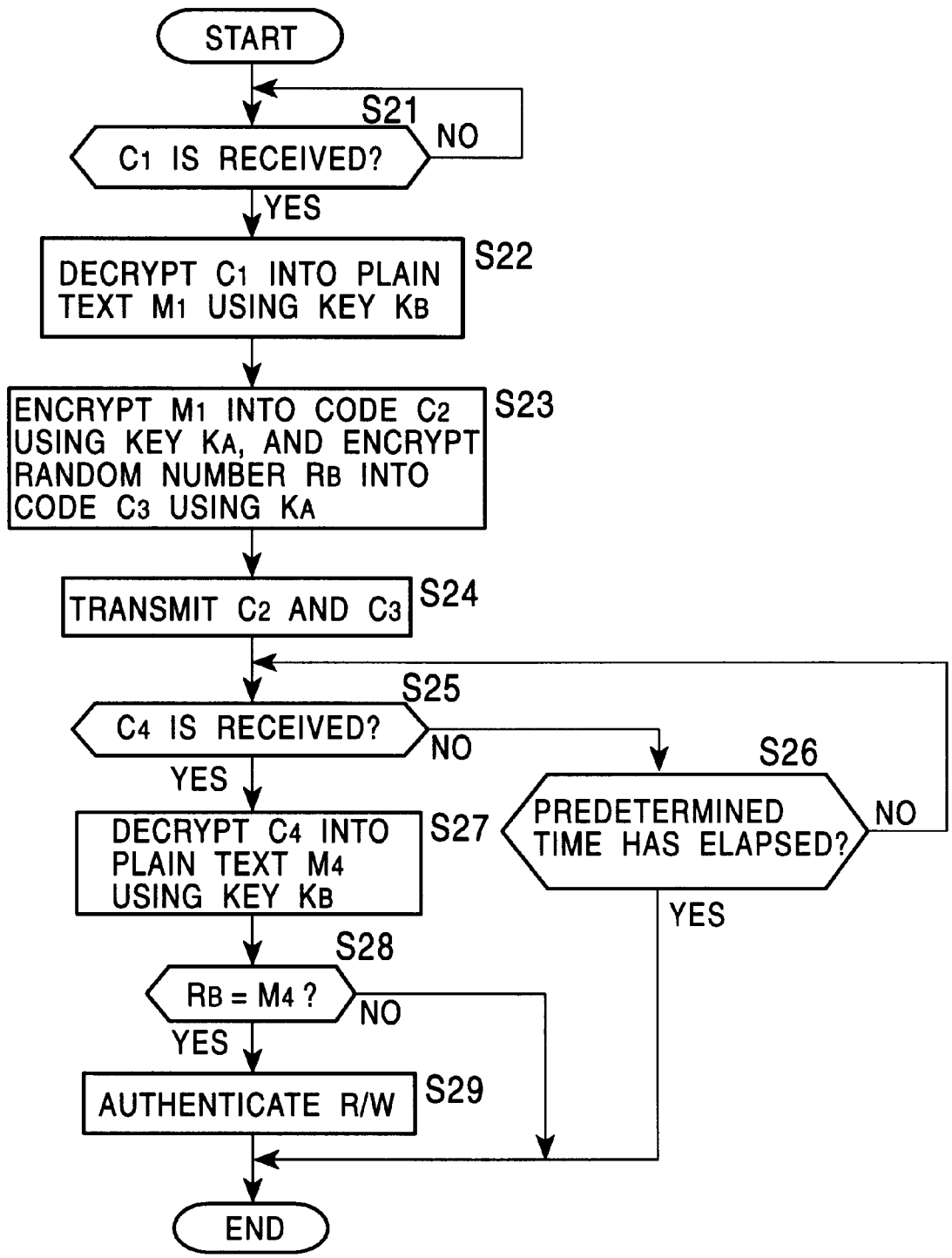
FIG. 8 is a flowchart illustrating the operation of the IC card 2 during mutual authentication in FIG. 1.
Figure 9:
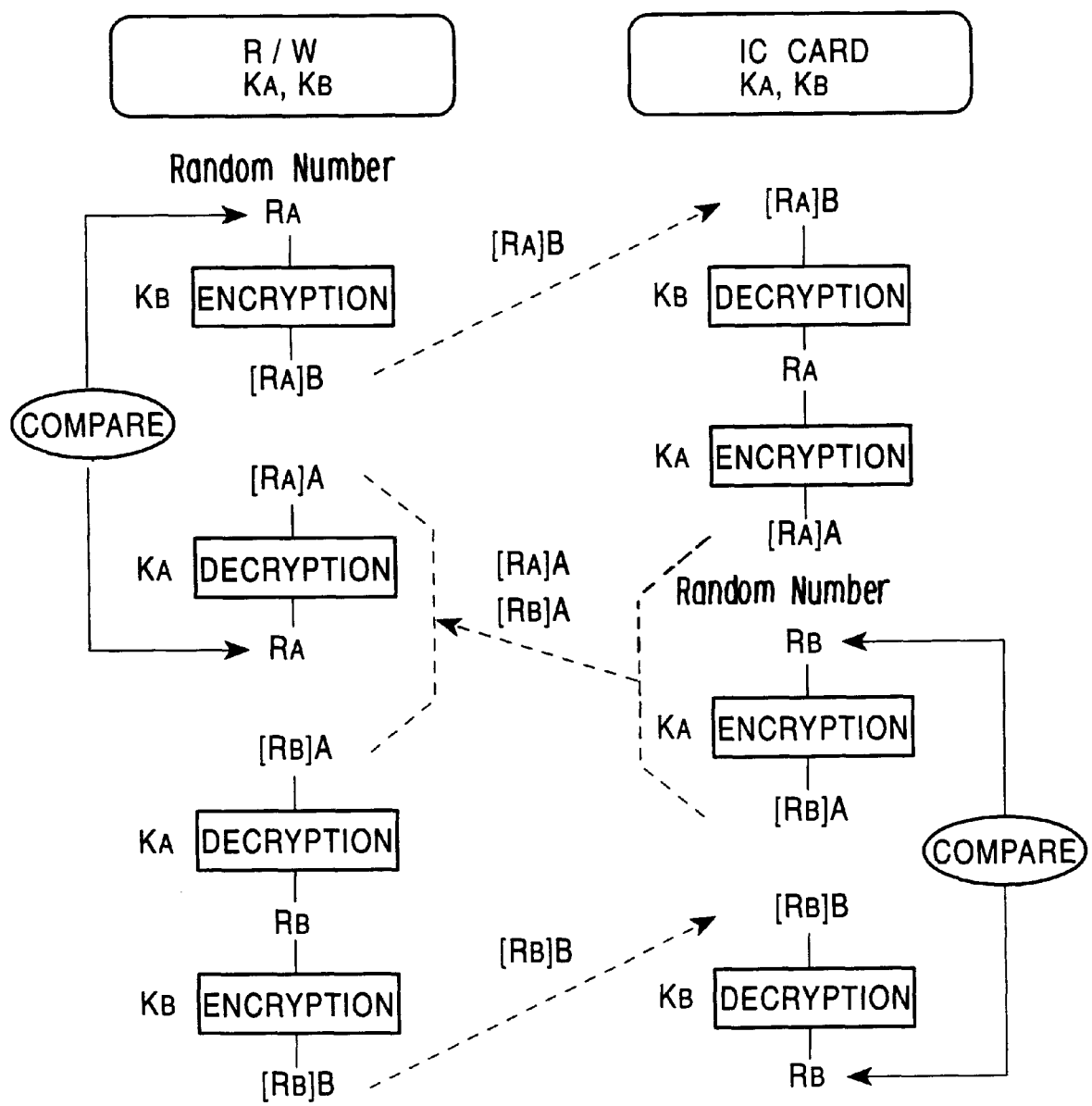
FIG. 9 shows the operation of the non-contact card system during mutual authentication in FIG. 1.

As described above, during the period in which the R/W 1 processes and transmits the modulated waves in steps S1 and S2, the IC card 2 waits in step S21 of FIG. 8.

When the modulated waves are transmitted from the R/W 1, the receiving section 88 of the IC card 2 receives the modulated waves transmitted from the transmission section 16 of the R/W 1, demodulates the modulated waves, and outputs the demodulated data (code $C_1$) to the decryption section 83.

Next, in step S22, of FIG. 8 the conversion section 42 of a decryption section 83 of the IC card 2 decrypts the code $C_1$ supplied from the receiving section 88 by using the key $K_B$ previously supplied to the key storage section 41 from the control section 81, and outputs the decrypted data (plain text $M_1$) (second data) to the control section 81.

In step S23, the control section 81 of the IC card 2 outputs the plain text $M_1$ supplied from the decryption section 83 to the data randomization section 32 of the encryption section 82. The data randomization section 32 of the encryption section 82 reads a key $K_A$ prestored in the key storage section 31, encrypts the plain text $M_1$ using the key $K_A$ in the same way as the data randomization section 32 of the encryption section 12 of the R/W 1 in step S1, of FIG. 7 and outputs the generated code $C_2$ (second code) ($[R_A]_A$ of FIG. 9) to the transmission section 86.

Further, the control section 81 generates a random number $R_B$ (third data) and outputs the random number $R_B$ to the data randomization section 32 of the encryption section 82. The data randomization section 32 of the encryption section 82 reads a key $K_A$ from the key storage section 31, encrypts the random number $R_B$ using the key $K_A$, and outputs the generated code $C_3$ (third code) ($[R_B]_A$ of FIG. 9) to the transmission section 86.

Then, in step S24, of FIG. 8 the transmission section 86 of the IC card 2 modulates the codes $C_2$ and $C_3$ and transmits the generated modulated waves to the R/W 1 via the antenna section 87.

While the IC card 2 is performing the process from steps S21 to S24 as described above, the R/W 1 waits in steps S3 and S4 of FIG. 7 until the codes $C_2$ and $C_3$ are transmitted from the IC card 2, and monitors in step S3 the time elapsed from when the code $C_1$ was transmitted. When a predetermined time (a time longer than the time normally required for processing in the IC card 2) has elapsed from the time the codes $C_2$ and $C_3$ have been transmitted from the IC card 2, the process returns to step S2 where the code $C_1$ is retransmitted.

Then, when the modulated waves containing the codes $C_2$ and $C_3$ are transmitted from the IC card 2, the receiving section 18 of the R/W 1 receives the modulated waves transmitted from the transmission section 86 of the IC card 2 via the antenna section 17, and demodulates the modulated waves. Then, the receiving section 18 outputs the demodulated data (codes $C_2$ and $C_3$) to the decryption section 13.

Next, in step S5, the conversion section 42 of the decryption section 13 of the R/W 1 reads the key $K_A$ previously supplied to the key storage section 41, decrypts the data (codes $C_2$ and $C_3$) supplied from the receiving section 18, and outputs the decrypted data (plain text $M_2$ (corresponding to the code $C_2$) (fourth data) and plain text $M_3$ (corresponding to the code $C_3$) (fifth data)) to the control section 11.

Then, in step S6, the control section 11 of the R/W 1 determines whether the plain text $M_2$ and the random number $R_A$ are the same. When it is determined that the plain text $M_2$ and the random number $R_A$ are the same, in step S7, the R/W 1 determines that the IC card 2 has the same keys $K_A$ and $K_B$ as those of the R/W 1, and authenticates the IC card 2.

When, on the other hand, it is determined in step S6 that the plain text $M_2$ and the random number $R_A$ are not the same, the R/W 1 does not authenticate the R/W 1, and the authentication process is terminated.

After the IC card 2 is authenticated in step S7, in step S8, the control section 11 of the R/W 1 outputs the plain text $M_3$ generated in step S5 to the encryption section 12. Then, the encryption section 12 encrypts the plain text $M_3$ using the key $K_B$ in a manner similar to step S1, and outputs the generated code $C_4$ (fourth code) ($[R_B]_B$ of FIG. 9) to the transmission section 16.

In step S9, the transmission section 16 of the R/W 1 modulates the code $C_4$ supplied from the encryption section 12 and transmits the generated modulated waves to the IC card 2 via the antenna section 17.

While the R/W 1 is performing the process in steps S4 to S9 as described above, the IC card 2 waits in steps S25 and S26 of FIG. 8 until the code $C_4$ is transmitted. At this time, the control section 81 of the IC card 2 monitors the time elapsed from when the codes $C_2$ and $C_3$ were transmitted. When it is determined in step S26 that a predetermined time has elapsed from the time the codes $C_2$ and $C_3$ have been transmitted, the authentication process is terminated without authenticating the R/W 1.

On the other hand, when the modulated waves containing the code $C_4$ are transmitted, the receiving section 88 of the IC card 2 receives the modulated waves transmitted from the R/W 1 via the antenna section 87 and demodulates the modulated waves. Then, the receiving section 88 outputs the demodulated data (code $C_4$) to the decryption section 13.

Next, in step S27, the conversion section 42 of the decryption section 83 of the IC card 2 decrypts the data (code $C_4$) supplied from the receiving section 88 using the key $K_B$ read from the key storage section 41 and outputs the decrypted data (plain text $M_4$) (sixth data) to the control section 81.

Then, in step S28, the control section 81 of the IC card 2 determines whether the plain text $M_4$ and the random number $R_B$ are the same. When it is determined that the plain text $M_4$ and the random number $R_B$ are the same, the IC card 2 determines in step S29 that the R/W 1 has the same keys $K_A$ and $K_B$ as those of the IC card 2 and authenticates the R/W 1.

On the other hand, when it is determined in step S28 that the plain text $M_4$ and the random number $R_B$ are not the same, the IC card 2 does not authenticate the R/W 1, and the authentication process is terminated.

In the above-described way, as shown in FIG. 7, the R/W 1 performs a process for authenticating the IC card 2. The IC card 2, as shown in FIG. 8, performs a process for authenticating the R/W 1. Thus, a mutual authentication process is performed.

Although the above-described data randomization section 32 of the encryption sections 12 and 82 performs encryption by a DES method, encryption may be performed by other methods (e.g., a FEAL (Fast Encryption Algorithm)—8 method). In such a case, the conversion section 42 of the decryption sections 13 and 83 performs decryption in conformance with the encryption method.

Further, when the FEAL—8 method is used, it is possible to perform mutual authentication in approximately 32 milliseconds (the time required for processing in the IC card 2 is approximately 28 milliseconds).

Next, referring to the flowcharts of FIGS. 10 and 11, a description will be given of communications between the R/W 1 and the IC card 2 after the above-described authentication process (after they have authenticated each other).

Figure 10:
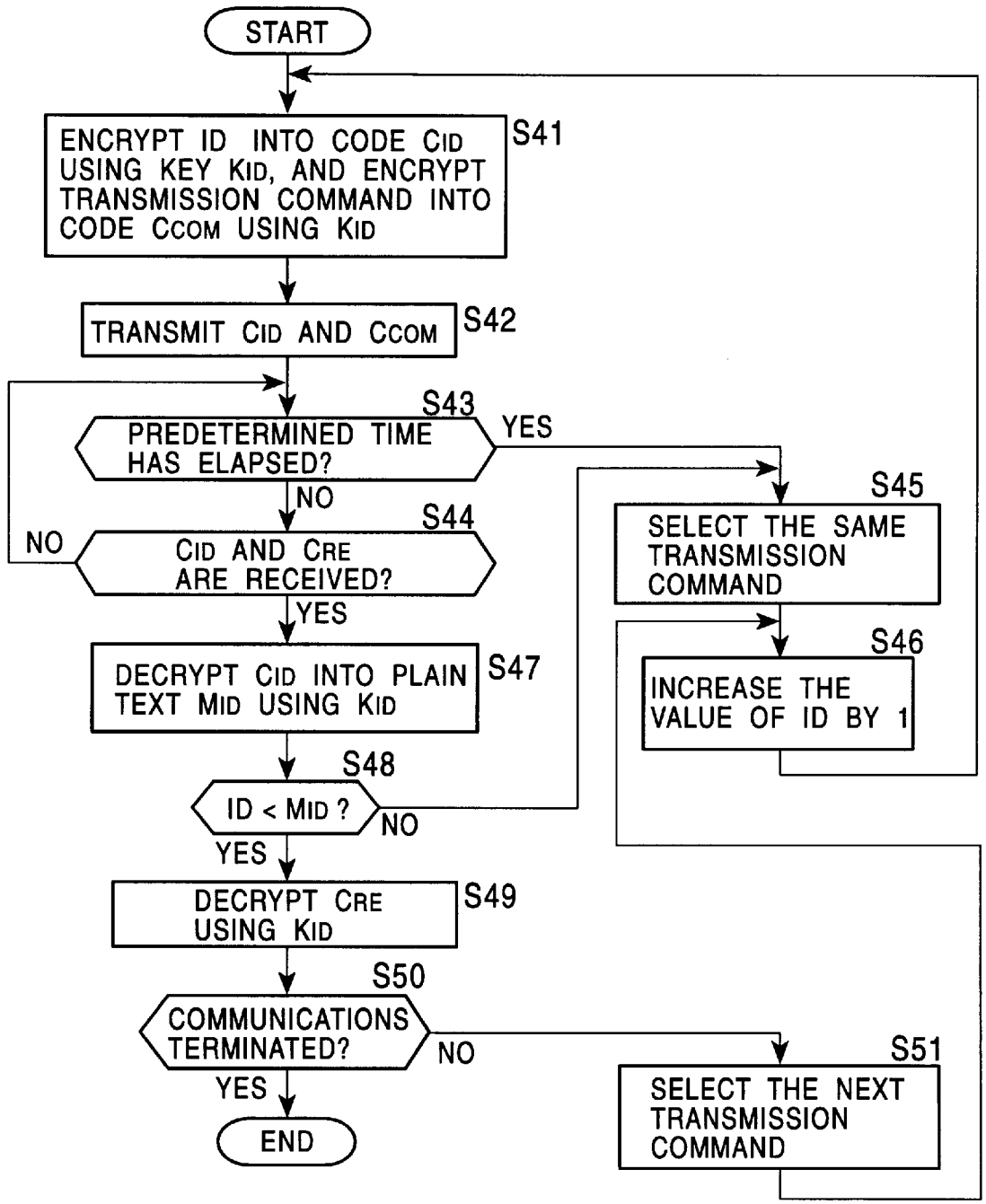
FIG. 10 is a flowchart illustrating the process of the R/W 1 during communication in FIG. 1.

In step S41 in FIG. 10, initially, the control section 11 of the R/W 1 holds the random number $R_A$ in the above-described process as an identification number ID, and outputs, as a new key $K_{ID}$ (third key), the random number $R_B$ (plain text $M_3$) (since the IC card 2 is authenticated, the R/W 1 uses the plain text $M_3$ as the random number $R_B$) to the key storage section 31 of the encryption section 12 and the key storage section 41 of the decryption section 13.

Then, the control section 11 of the R/W 1 outputs a command (transmission command) corresponding to the process to be performed by the IC card 2 to the data randomization section 32 of the encryption section 12. The data randomization section 32 of the encryption section 12 reads the key $K_{ID}$ from the key storage section 31, encrypts the transmission command using the key $K_{ID}$, and outputs the generated code Ccom (fifth code) to the transmission section 16.

Further, the control section 11 of the R/W 1 outputs the identification number ID to the data randomization section 32 of the encryption section 12. The data randomization section 32 of the encryption section 12 encrypts the identification number ID using the key $K_{ID}$ and outputs the generated code $C_{ID}$ (sixth code) to the transmission section 16.

In step S42, the transmission section 16 of the R/W 1 modulates the codes Ccom and $C_{ID}$ supplied from the encryption section 12 and transmits the generated modulated waves to the IC card 2 via the antenna section 17.

Until the R/W 1 transmits the modulated waves containing the codes Ccom and $C_{ID}$ as described above, the IC card 2 waits in step S61 in FIG. 11.

The control section 81 of the IC card 2 outputs in advance, as the key $K_{ID}$, the random number $R_B$ in the above-described authentication process to the key storage section 31 of the encryption section 82 and the key storage section 41 of the decryption section 83, and further holds the random number $R_A$ (plain text $M_1$) (since the R/W 1 is authenticated, the IC card 2 uses the plain text $M_1$ as the random number $R_A$) as the identification number ID.

Then, when the modulated waves containing the codes Ccom and $C_{ID}$ are transmitted from the R/W 1, the receiving section 88 of the IC card 2 receives the modulated waves transmitted from the transmission section 16 of the R/W 1 via the antenna section 87 and demodulates the modulated waves. Then, the receiving section 88 outputs the demodulated data (codes Ccom and $C_{ID}$) to the decryption section 83.

In step S62, the conversion section 42 of the decryption section 83 decrypts the code $C_{ID}$ of the supplied data using the key $K_{ID}$ prestored in the key storage section 41 and outputs the decrypted data (plain text $M_{ID}$) (seventh data) to the control section 81.

Then, in step S63, the control section 81 of the IC card 2 determines whether the value of the plain text $M_{ID}$ is the identification number ID or greater. When it is determined that the value of the plain text $M_{ID}$ is smaller than the identification number ID, the communication process is terminated. When, on the other hand, it is determined that the value of the plain text $M_{ID}$ is the identification number ID or greater, in step S64, the control section 81 acknowledges the received command (code $C_{com}$) and causes the decryption section 83 to decrypt the code $C_{com}$, in step S65, performs a process corresponding to the decrypted command, and in step S66, prepares response data (data to be transmitted to the R/W 1) corresponding to the processing results.

Next, in step S67, the control section 81 of the IC card 2 increases the value of the identification number ID by 1, after which it outputs the identification number ID and the response data in sequence to the encryption section 82. In step S68, the encryption section 82 encrypts the identification number ID into code $C_{ID}$ (eighth code) using the key $K_{ID}$ and further encrypts the response data into code $C_{RE}$ (seventh code) using the key $K_{ID}$, after which it outputs the code $C_{ID}$ and the code $C_{RE}$ to the transmission section 86.

Then, in step S69, the transmission section 86 modulates the code $C_{ID}$ and the code $C_{RE}$ and transmits the generated modulated waves to the R/W 1.

While the IC card 2 is performing a process corresponding to the transmitted command in steps S61 and S69, the R/W 1 waits in steps S43 and S44 in FIG. 10 and further in step S43 monitors the time elapsed from when the codes $C_{ID}$ and Ccom are transmitted.

Then, when a predetermined preset time has elapsed, the process proceeds to step S45 where the R/W 1 selects the same command as that encrypted in step S41, and the value of the identification number ID is increased by 1 in step S46. Thereafter, the process returns to step S41 where the transmission command and the identification number ID are encrypted, and in step S42, the generated codes are retransmitted to the IC card 2.

On the other hand, when the modulated waves containing the code $C_{ID}$ and the code $C_{RE}$ are received from the IC card 2 in step S44, the receiving section 18 of the R/W 1 demodulates the modulated waves into the code $C_{ID}$ and the code $C_{RE}$, and outputs the codes $C_{ID}$ and $C_{RE}$ to the decryption section 13.

In step S47, the decryption section 13 decrypts the code $C_{ID}$ using the key $K_{ID}$ and outputs the generated plain text $M_{ID}$ (ninth data) to the control section 11.

In step S48, the control section 11 determines whether the value of the plain text $M_{ID}$ is greater than the identification number ID. When it is determined that the value of the plain text $M_{ID}$ is equal to or smaller than the identification number ID, the process proceeds to step S45 where the same command as that transmitted in step S41 is selected. In step S46, the value of the identification number ID is increased by 1, after which the process returns to step S41 where the transmission command and the identification number ID are encrypted, and in step S42, the generated codes are retransmitted to the IC card 2.

On the other hand, when it is determined in step S48 that the value of the plain text $M_{ID}$ is greater than the identification number ID, the control section 11 causes the decryption section 13 to decrypt the code $C_{RE}$ and receives response data from the IC card 2 in step S49.

Then, in step S50, the control section 11 of the R/W 1 determines whether the communication is to be terminated. When the communication is to be continued, the process proceeds to step S51 where the control section 11 of the R/W 1 selects the next transmission command.

Then, the process proceeds to step S46 where the value of the identification number ID is increased by 1, after which the process returns to step S41, and the next transmission command is transmitted in step S41 and et seq.

In the above-described way, using the random numbers $R_A$ and $R_B$ transmitted during mutual authentication as an identification number ID and a new key $K_{ID}$, the R/W 1 transmits a predetermined command to the IC card 2. The IC card 2 performs a process corresponding to the command, after which it transmits response data corresponding to the processing results to the R/W 1. As a result of the above, it is possible to confirm that the communication party is an authorized party for each communication by using the identification number and the new key. Also, since the value of the identification number ID is increased by 1 for each communication, it is possible to know the number of communications up to the present time and to grasp the passage of processing.

Figure 11:
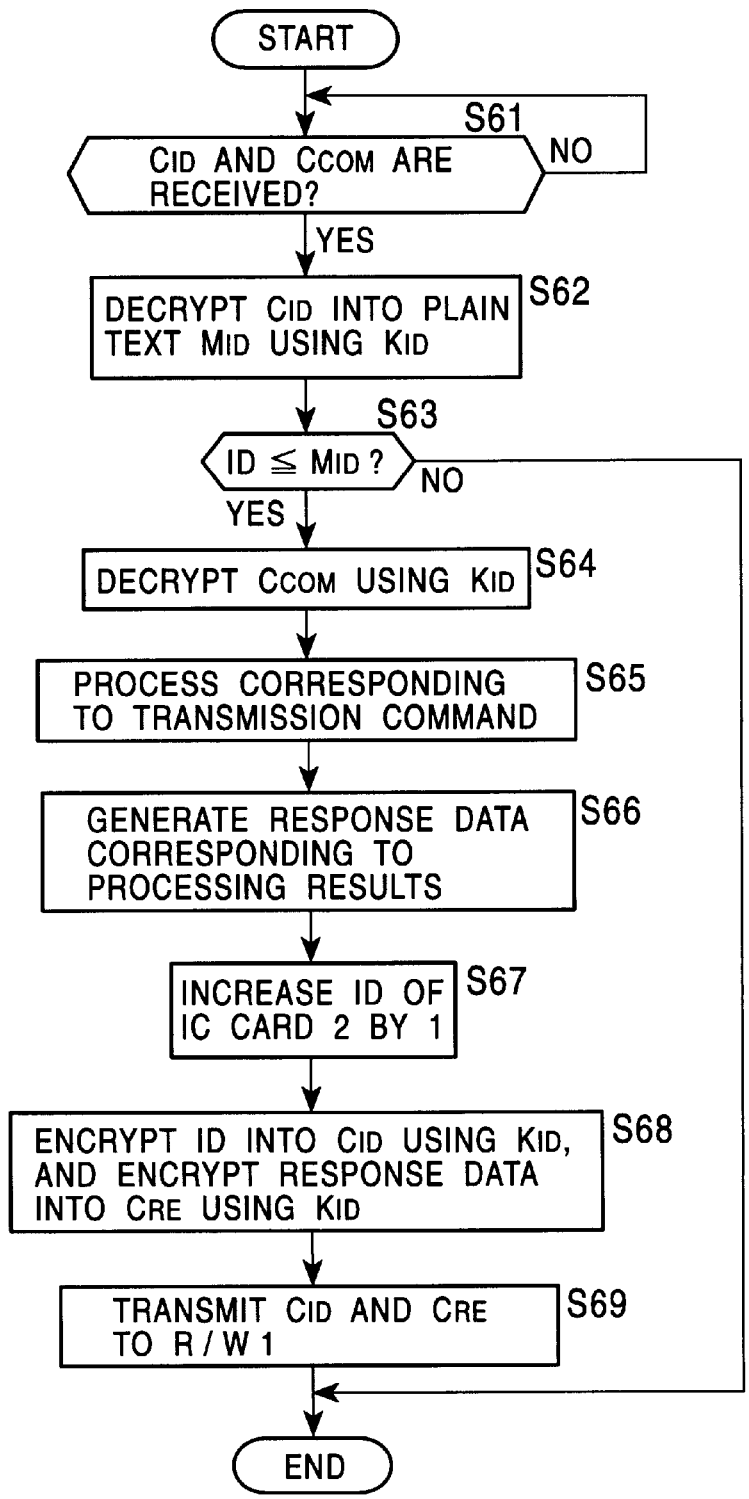
FIG. 11 is a flowchart illustrating the process of the IC card 2 during communication in FIG. 1.

Although in step S63 of FIG. 11 the control section 81 of the IC card 2 determines whether the plain text $M_{ID}$ is equal to or greater than the identification number ID, it is also possible to determine whether the value of the plain text $M_{ID}$ is equal to a value within a predetermined range (e.g., the range of ID to ID+16) corresponding to the identification number ID. As a result of the above, when, for example, a failure occurs in the transmission line and the electromagnetic waves (the value of the identification number is ID) radiated from the R/W 1 do not reach the IC card 2, the IC card 2 is capable of receiving data (the value of the identification number is ID+1, but the transmitted command is the same as that transmitted previously) to be transmitted next.

Or, in step S63, the control section 81 of the IC card 2 may also determine whether the value of, for example, the low-order 8 bits of the plain text $M_{ID}$ (64 bits) is equal to or greater than the value of the low-order 8 bits of the identification number ID. By making a comparison for only a predetermined number of digits (number of bits) n, the number of bit computations is decreased as compared to a case in which a comparison is made for 64 bits, and thus processing can be performed quickly. In this case, since a carryover occurs (an error occurs in the comparison results), if the value of the identification number ID becomes greater than $2^n-1$ (n is the number of digits), by taking into consideration the number of communications between the R/W 1 and the IC card 2, the number n of digits is set so that the value of the identification number ID does not become greater than $2^n-1$ (n is the number of digits).

Further, in a similar manner, in step S48, of FIG. 10 the control section 11 of the R/W 1 may determine whether the value of the plain text $M_{ID}$ is the same as a value within a predetermined range corresponding to the identification number ID. Also, in step S48, the control section 11 of the R/W 1 may determine whether the value of, for example, the low-order 8 bits of the plain text $M_{ID}$ is greater than the low-order 8 bits of the identification number ID.

Figure 12:
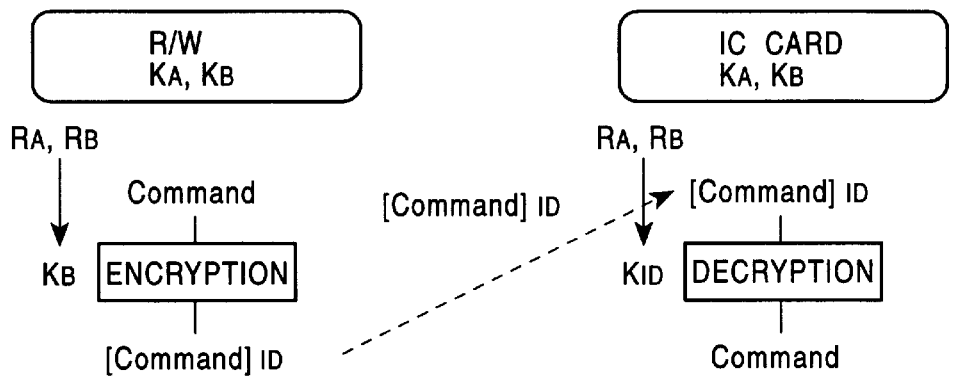
FIG. 12 shows another example of communication between the R/W 1 and the IC card 2.

Although in the above-described embodiment the random number $R_B$ is used as a new key $K_{ID}$, as shown in FIG. 12, a new key $K_{ID}$ may be computed from the random numbers $R_A$ and $R_B$ so that communications are performed using the key $K_{ID}$.

Figure 13:
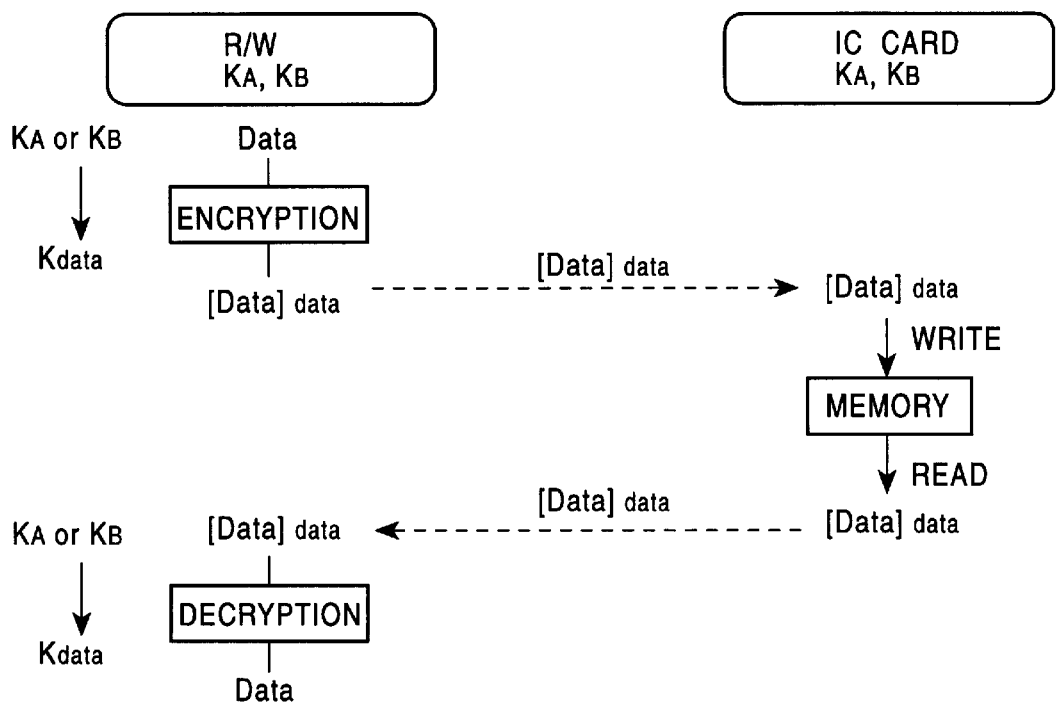
FIG. 13 shows still another example of communication between the R/W 1 and the IC card 2.
Figure 14:
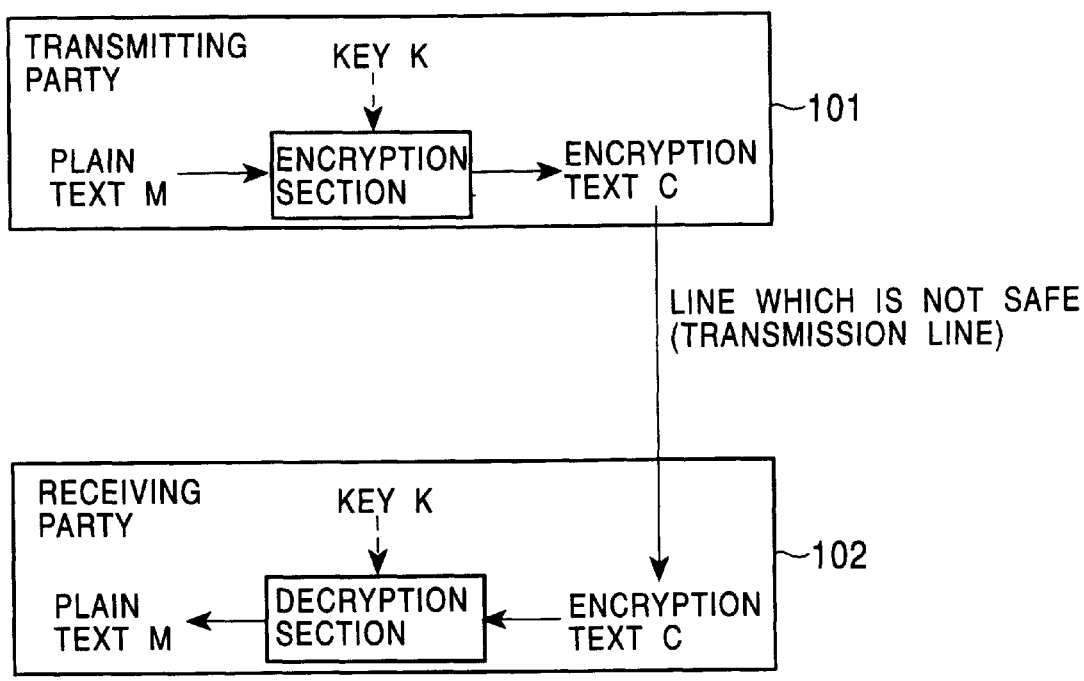
FIG. 14 is a block diagram illustrating an example of communication utilizing a secret code.
Figure 15:
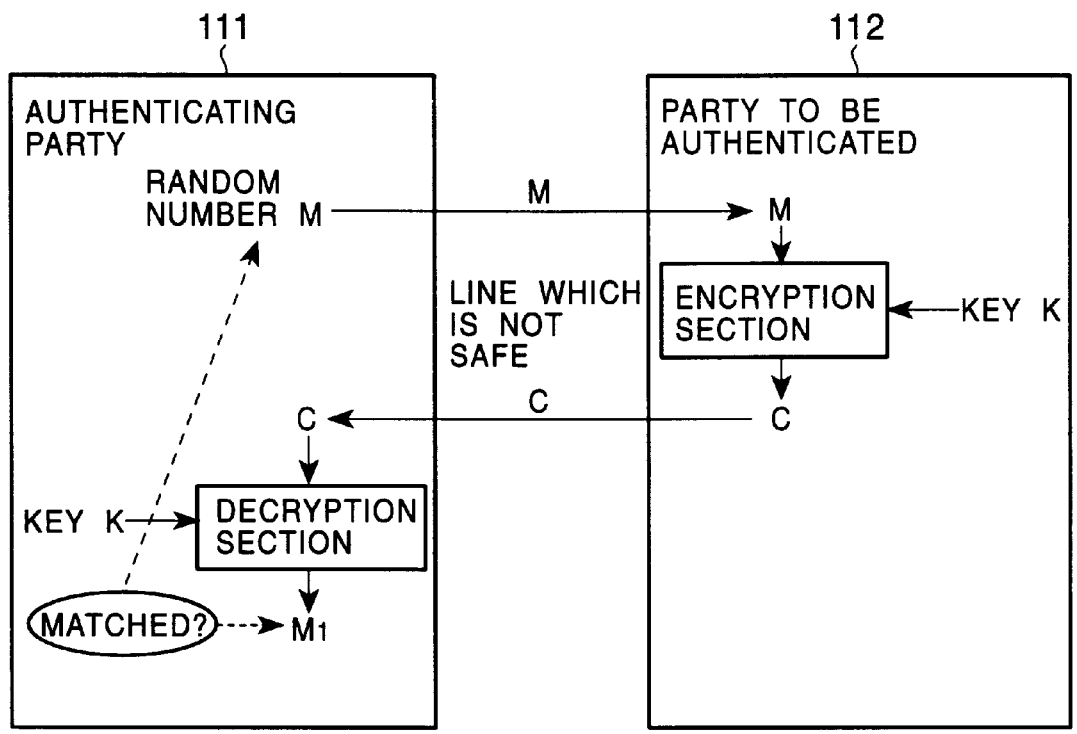
FIG. 15 is a block diagram illustrating an example of authentication utilizing a secret code.

Further, when information transmitted by the R/W 1 is simply to be stored in the IC card 2, as shown in FIG. 13, it may also be possible for the IC card 2 to store received data (data encrypted using the key $K_A$ or $K_B$) as it is in the memory 84 without being decrypted, and read the data from the memory 84 when a read command from the R/W 1 is received and transmit it as it is.

As has been described up to this point, according to the authentication method, a first information processing apparatus encrypts first data into a first code, a second information processing apparatus decrypts the first code into second data and encrypts the second data into a second code and further encrypts third data into a third code, the first information processing apparatus decrypts the second code into fourth data, and the first information processing apparatus authenticates the second information processing apparatus on the basis of the first data and the fourth data. Further, the first information processing apparatus decrypts the third code into fifth data and encrypts the fifth data into a fourth code, the second information processing apparatus decrypts the fourth code into sixth data, and the second information processing apparatus authenticates the first information processing apparatus on the basis of the third data and the sixth data. Thus, it is possible for the two information processing apparatuses to authenticate each other.

According to the communication method, the first information processing apparatus transmits to the second information processing apparatus the first code such that the first data is encrypted, the second information processing apparatus receives the first code and decrypts the first code into second data and further transmits to the first information processing apparatus the second code such that the second data is encrypted and the third code such that the third data is encrypted, the first information processing apparatus receives the second code and the third code, decrypts the second code of these codes into fourth data, and the first information processing apparatus authenticates the second information processing apparatus on the basis of the first data and the fourth data. Further, the first information processing apparatus decrypts the third code into fifth data and transmits to the second information processing apparatus the fourth code such that the fifth data is encrypted, the second information processing apparatus receives the fourth code and decrypts the fourth code into sixth data and further authenticates the first information processing apparatus on the basis of the third data and the sixth data. Thus, it is possible for the two information processing apparatuses which have authenticated each other to perform communications.

According to the information processing apparatus, the encryption means encrypts first data into a first code using a first key, the transmission means transmits the first code to another information processing apparatus, the receiving means receives a second code and a third code, and the decryption means decrypts the second code into fourth data using a second key and further decrypts the third code into fifth data using the second key, the authentication means authenticates the other information processing apparatus on the basis of the first data and the fourth data, the encryption means encrypts the fifth data into a fourth code using the first key, and the transmission means transmits the fourth code to the other information processing apparatus. Thus, it is possible to authenticate a given information processing apparatus and then to be authenticated by the information processing apparatus.

According to the information processing apparatus, the receiving means receives a first code from another information processing apparatus, the decryption means decrypts the first code into first data using a first key, the encryption means encrypts the first data into a second code using a second key and further encrypts the second data into a third code using the second key, the transmission means transmits the second code and the third code to the other information processing apparatus, the receiving means receives a fourth code from the other information processing apparatus, the decryption means decrypts the fourth code into third data using the second key, and the authentication means authenticates the other information processing apparatus on the basis of the second data and the third data. Thus, it is possible to authenticate a given information processing apparatus and then to be authenticated by the information processing apparatus.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An authentication method between a first information processing apparatus and a second information processing apparatus, wherein said first information processing apparatus and said second information processing apparatus include storage means for storing a first key and a second key, encryption means for encrypting predetermined data using either one of said first key and said second key and decryption means for decrypting a code generated by either one of said second key and said first key, said method comprising the steps of:

encrypting random first data into a first code using said first key of said encryption means of said first information processing apparatus;

decrypting said first code into second data using said first key of said decryption means of said second information processing apparatus;

encrypting said second data into a second code using said second key of said encryption means of said second information processing apparatus;

encrypting random third data into a third code using said second key of said encryption means of said second information processing apparatus;

decrypting said second code into fourth data using said second key of said decryption means of said first information processing apparatus;

authenticating said second information processing apparatus by said first information processing apparatus on the basis of said first data and said fourth data;

decrypting said third code into fifth data using said second key of said decryption means of said first information processing apparatus;

encrypting said fifth data into a fourth code using said first key of said encryption means of said first information processing apparatus;

decrypting said fourth code into sixth data using said first key of said decryption means of said second information processing apparatus; and authenticating said first information processing apparatus by said second information processing apparatus on the basis of said third data and said sixth data.

2. A communication method between a first information processing apparatus and a second information processing apparatus, wherein said first information processing apparatus and said second information processing apparatus include storage means for storing a first key and a second key, encryption means for encrypting predetermined data using either one of said first key and said second key, decryption means for decrypting a code generated by either one of said second key and said first key, transmission means for transmitting said encrypted predetermined data and receiving means for receiving said encrypted predetermined data, said method comprising the steps of:

encrypting random first data into a first code using said first key of said encryption means of said first information processing apparatus;

transmitting said first code to said second information processing apparatus using said transmission means of said first information processing apparatus;

receiving said first code from said first information processing apparatus using said receiving means of said second information processing apparatus;

decrypting said first code into second data using said first key of said decryption means of said second information processing apparatus;

encrypting said second data into a second code using said second key of said encrypting means of said second information processing apparatus;

encrypting random third data into a third code using said second key of said encryption means of said second information processing apparatus;

transmitting said second code and said third code to said first information processing apparatus using said transmission means of said second information processing apparatus;

receiving said second code and said third code from said second information processing apparatus using said receiving means of said first information processing apparatus;

decrypting said second code into fourth data using said second key of said decryption means of said first information processing apparatus;

authenticating said second information processing apparatus by said first information processing apparatus on the basis of said first data and said fourth data;

decrypting said third code into fifth data using said second key of said decryption means of said first information processing apparatus;

encrypting said fifth data into a fourth code using said first key of said second encryption means of said first information processing apparatus;

transmitting said fourth code to said second information processing apparatus using said transmission means of said first information processing apparatus;

receiving said fourth code from said first information processing apparatus using said receiving means of said second information processing apparatus;

decrypting said fourth code into sixth data using said first key of said decryption means of said second information processing apparatus; and authenticating said first information processing apparatus by said second information processing apparatus on the basis of said third data and said sixth data.

3. The communication method according to claim 2, wherein said first data is a predetermined identification number, said third data is a third key, said encryption means of said first information processing apparatus encrypts a first command into a fifth code using said third key and encrypts said predetermined identification number into a sixth code using said third key, said transmission means of said first information processing apparatus transmits said fifth code with said sixth code, said receiving means of said second information processing apparatus receives said fifth code and said sixth code, said decryption means of said second information processing apparatus decrypts said fifth code into a second command using said third key and decrypts said sixth code into seventh data using said third key, and said second information processing apparatus authenticates said second command on the basis of said seventh data and said predetermined identification number.

4. The communication method according to claim 3, wherein said predetermined identification number of said first information processing apparatus is changed for each encryption of said first command.

5. The communication method according to claim 4, wherein said predetermined identification number of said first information processing apparatus is increased for each encryption of said first command.

6. The communication method according to claim 3, wherein said second information processing apparatus authenticates said second command when said seventh data has a value within a predetermined range corresponding to said predetermined identification number.

7. The communication method according to claim 3, wherein said second information processing apparatus compares a first value of said seventh data in a range of a predetermined number of digits with a second value of said predetermined identification number in said range of said predetermined number of digits and authenticates said second command when the first value within said range of said predetermined number of digits in said seventh data is at least equal to the second value within said range of said predetermined number of digits in said predetermined identification number.

8. The communication method according to claim 3, wherein said second information processing apparatus performs a process corresponding to said second command and generates response data corresponding to the process results, said encryption means of said second information processing apparatus encrypts said response data into a seventh code using said third key and encrypts said predetermined identification number into an eighth code using said third key, said transmission means of said second information processing apparatus transmits said seventh code with said eighth code, said receiving means of said first information processing apparatus receives said seventh code and said eighth code, said decryption means of said first information processing apparatus decrypts said seventh code into eighth data using said third key and decrypts said eighth code into ninth data using said third key, and said first information processing apparatus authenticates said eighth data as said response data on the basis of said ninth data and said predetermined identification number.

9. The communication method according to claim 8, wherein said predetermined identification number of said second information processing apparatus is changed for each encryption of said eighth data.

10. The communication method according to claim 9, wherein said predetermined identification number of said second information processing apparatus is increased for each encryption of said eighth data.

11. The communication method according to claim 8, wherein said first information processing apparatus authenticates said eighth data as said response data when said ninth data has a value within a predetermined range corresponding to said predetermined identification number.

12. The communication method according to claim 8, wherein said first information processing apparatus compares a first value of said ninth data in a range of a predetermined number of digits with a second value of said predetermined identification number in said range of said predetermined number of digits, and authenticates said eighth data as said response data when the first value within said range of said predetermined number of digits in said ninth data is at least equal to the second value within said range of said predetermined number of digits in said predetermined identification number.

13. The communication method according to claim 8, wherein said first information processing apparatus increases said predetermined identification number when a predetermined time has elapsed, the predetermined time being from when said fifth code is transmitted with said sixth code until said seventh code and said eighth code are received, encrypts said predetermined identification number into said sixth code, and retransmits said fifth code with said sixth code.

14. The communication method according to claim 8, wherein when said first information processing apparatus does not authenticate said eighth data as said response data, said first information processing apparatus increases said predetermined identification number, encrypts said predetermined identification number into said sixth code, and retransmits said fifth code with said sixth code.

15. An information processing apparatus of a plurality of information processing apparatuses, comprising:

storage means for storing a first key and a second key;

encryption means for encrypting predetermined data using one of said first key and said second key;

decryption means for decrypting a code generated by one of said second key and said first key;

transmission means for transmitting a code encrypted by said encryption means to one of said plurality of information processing apparatuses;

receiving means for receiving a code from said one of said plurality of information processing apparatuses; and authentication means for authenticating said one of said plurality of information processing apparatuses on the basis of said predetermined data and data generated by decrypting the code received from said one of said plurality of information processing apparatuses, wherein said encryption means encrypts random first data into a first code using said first key, said transmission means transmits said first code to said one of said plurality of information processing apparatuses, said receiving means receives a second code and a third code from said one of said plurality of information processing apparatuses, said decryption means decrypts said second code into second data using said second key and decrypts said third code into third data using said second key, said authentication means authenticates said one of said plurality of information processing apparatuses on the basis of said first data and said second data, said encryption means encrypts said third data into a fourth code using said first key, and said transmission means transmits said fourth code to said one of said plurality of information processing apparatuses.

16. The information processing apparatus of said plurality of information processing apparatuses according to claim 15, wherein said first data is a predetermined identification number, said third data is a third key, said encryption means encrypts a first command into a fifth code using said third key and encrypts said predetermined identification number into a sixth code using said third key, and said transmission means transmits said fifth code with said sixth code to said one of said plurality of information processing apparatuses.

17. The information processing apparatus of said plurality of information processing apparatuses according to claim 16, wherein said receiving means receives from said one of said plurality of information processing apparatuses a seventh code encrypted from response data corresponding to processing results corresponding to said first command and receives an eighth code encrypted from said predetermined identification number in said of one of said plurality of information processing apparatuses, said decryption means decrypts said seventh code into fourth data using said third key and decrypts said eighth code into fifth data using said third key, and said authentication means authenticates said fourth data as said response data on the basis of said fifth data and said predetermined identification number.

18. The information processing apparatus of said plurality of information processing apparatuses according to claim 16, wherein said predetermined identification number is changed for each encryption of said first command.

19. The information processing apparatus of said plurality of information processing apparatuses according to claim 18, wherein said predetermined identification number is increased for each encryption of said first command.

20. The information processing apparatus of said plurality of information processing apparatuses according to claim 17, wherein said authentication means authenticates said fourth data as said response data when said fifth data has a value within a predetermined range corresponding to said predetermined identification number.

21. The information processing apparatus of said plurality of information processing apparatuses according to claim 20, wherein said authentication means compares a first value of said fifth data in a range of a predetermined number of digits with a second value of said predetermined identification number in said range of said predetermined number of digits, and authenticates said fourth data as said response data when the first value within said range of said predetermined number of digits in said fifth data is at least equal to the second value within said range of said predetermined number of digits in said predetermined identification number.

22. The information processing apparatus of said plurality of information processing apparatuses according to claim 17, wherein when a predetermined time has elapsed, the predetermined time being from when said fifth code is transmitted with said sixth code until said seventh code and said eighth code are received, said predetermined identification number is increased, said predetermined identification number is encrypted to said sixth code, and said fifth code is retransmitted with said sixth code.

23. The information processing apparatus of said plurality of information processing apparatuses according to claim 17, wherein when said authentication means does not authenticate said fourth data as said response data, said predetermined identification number is increased, said predetermined identification number is encrypted to said sixth code, and said fifth code is retransmitted with said sixth code.

24. An information processing apparatus for use with a plurality of information processing apparatuses, comprising:

storage means for storing a first key and a second key;

encryption means for encrypting predetermined data using one of said first key and said second key;

decryption means for decrypting a code generated by one of said second key and said first key;

transmission means for transmitting a code encrypted by said encryption means to one of said plurality of information processing apparatuses;

receiving means for receiving a code from said one of said plurality of information processing apparatuses; and authentication means for authenticating said one of said plurality of information processing apparatuses on the basis of said predetermined data and data obtained by decrypting said code received from one of said plurality of information processing apparatuses, wherein said receiving means receives a first code from said one of said plurality of information processing apparatuses, said decryption means decrypts said first code into first data using said first key, said encryption means encrypts said first data into a second code using said second key and encrypts random second data into a third code using said second key, said transmission means transmits said second code and said third code to said one of said plurality of information processing apparatuses, said receiving means receives a fourth code from said one of said plurality of information processing apparatuses, said decryption means decrypts said fourth code into third data using said second key, and said authentication means authenticates said one of said plurality of information processing apparatuses on the basis of said second data and said third data.

25. The information processing apparatus of said plurality of information processing apparatuses according to claim 24, wherein said first data is a predetermined identification number, said second data is a third key, said receiving means receives from said one of said plurality of information processing apparatuses a fifth code encrypted from a first command using said third key and a sixth code encrypted from said predetermined identification number of said one of said plurality of information processing apparatuses, said decryption means decrypts said fifth code into a second command using said third key and decrypts said sixth code into fourth data using said third key, and said authentication means authenticates said second command on the basis of said fourth data and said predetermined identification number.

26. The information processing apparatus of said plurality of information apparatuses according to claim 25, further comprising:

processing means for performing a process corresponding to said second command and for generating response data corresponding to the process results, wherein said encryption means encrypts said response data into a seventh code using said third key and encrypts said predetermined identification number into an eighth code using said third key, and said transmission means transmits said seventh code with said eighth code.

27. The information processing apparatus of said plurality of information processing apparatuses according to claim 26, wherein said predetermined identification number is changed for each encryption of said seventh code.

28. The information processing apparatus of said plurality of information processing apparatuses according to claim 27, wherein said predetermined identification number is increased for each encryption of said seventh code.

29. The information processing apparatus of said plurality of information processing apparatuses according to claim 25, wherein said authentication means authenticates said second command when said fourth data has a value within a predetermined range corresponding to said predetermined identification number.

30. The information processing apparatus of said plurality of information processing apparatuses according to claim 25, wherein said authentication means compares a first value of said fourth data in a range of a predetermined number of digits with a second value of said predetermined identification number in said range of said predetermined number of digits and authenticates said second command when the first value within said range of said predetermined number of digits in said fourth data is at least equal to the second value within said range of said predetermined number of digits in said predetermined identification number.

* * * * *